United States Patent
Kashihara

(10) Patent No.: US 9,910,347 B2
(45) Date of Patent: Mar. 6, 2018

(54) IMAGE DISPLAY APPARATUS AND IMAGE GENERATION METHOD

(71) Applicant: SONY CORPORATION, Tokyo (JP)

(72) Inventor: Yoshiki Kashihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/315,754

(22) PCT Filed: May 11, 2015

(86) PCT No.: PCT/JP2015/002386
§ 371 (c)(1),
(2) Date: Dec. 2, 2016

(87) PCT Pub. No.: WO2015/190032
PCT Pub. Date: Dec. 17, 2015

(65) Prior Publication Data
US 2017/0090276 A1    Mar. 30, 2017

(30) Foreign Application Priority Data

Jun. 11, 2014   (JP) .................. 2014-120335

(51) Int. Cl.
*G03B 21/20* (2006.01)
*H04N 9/31* (2006.01)
(Continued)

(52) U.S. Cl.
CPC ........... *G03B 33/12* (2013.01); *G03B 21/006* (2013.01); *G03B 21/204* (2013.01);
(Continued)

(58) Field of Classification Search
CPC .............. G03B 21/204; G03B 21/2033; G03B 21/2066; G03B 21/2013; G03B 21/2006; H04N 9/3158; H04N 9/3161; H04N 9/316

See application file for complete search history.

(56) References Cited

U.S. PATENT DOCUMENTS 6,648,475 B1    11/2003   Roddy et al.
2010/0053478 A1*   3/2010   Maeda ................ H04N 9/3167
                                                               348/757
(Continued)

FOREIGN PATENT DOCUMENTS

JP    2004-29770 A    1/2004
JP    2007-218956 A   8/2007
(Continued)

OTHER PUBLICATIONS

International Search Report dated Jul. 28, 2015 in PCT/JP2015/002386.

*Primary Examiner* — Ryan Howard
(74) *Attorney, Agent, or Firm* — Oblon, McClelland, Maier & Neustadt, L.L.P.

(57) ABSTRACT

An image display apparatus according to an embodiment of the present technology includes a solid-state light source, an emission unit, and a selection unit. The solid-state light source is capable of emitting first visible light having a predetermined wavelength range. The emission unit includes an illuminant that emits second visible light, the illuminant being excited by the first visible light emitted from the solid-state light source, the second visible light having a wavelength range different from that of the first visible light, the emission unit being capable of emitting combined light including the first and second visible light. The selection unit selects third visible light from the com- (Continued)

bined light, the third visible light including the first visible light and light in a predetermined part of wavelength range of the second visible light.

8 Claims, 6 Drawing Sheets

(51) Int. Cl.
*G03B 33/12* (2006.01)
*G03B 21/00* (2006.01)

(52) U.S. Cl.
CPC ......... *G03B 21/208* (2013.01); *H04N 9/3161* (2013.01); *G03B 21/2066* (2013.01); *H04N 9/3158* (2013.01)

(56) References Cited

U.S. PATENT DOCUMENTS

| | | | |
|---|---|---|---|
| 2011/0051095 A1 | 3/2011 | Narimatsu et al. | |
| 2011/0228232 A1* | 9/2011 | Sakata | G02B 7/008 353/31 |
| 2011/0310353 A1 | 12/2011 | Maeda | |
| 2012/0327374 A1* | 12/2012 | Kitano | G03B 21/16 353/31 |

FOREIGN PATENT DOCUMENTS

| | | |
|---|---|---|
| JP | 2011-48139 A | 3/2011 |
| JP | 2011-248272 A | 12/2011 |

* cited by examiner

IMAGE DISPLAY APPARATUS AND IMAGE GENERATION METHOD

TECHNICAL FIELD

The present technology relates to an image display apparatus such as a projector, and an image generation method.

BACKGROUND ART

An image display apparatus such as a projector has been widely used. For example, light from a light source is modulated by a light modulation element such as a liquid crystal element, and the modulated light is projected on a screen or the like, thereby displaying an image. As the light source, a mercury lamp, a xenon lamp, an LED (Light Emitting Diode), an LD (Laser Diode), and the like are used. Among them, a solid-state light source such as an LED and an LD has such advantages that it has a long life-span, needs no existing lamp replacement, and immediately lights when power source is supplied thereto.

In Patent Document 1, as shown in FIG. 1 thereof, a video display apparatus including a reference light source 10 including LEDs of RGB colors and the like, and an excitation light source 20 that emits excitation light for generating auxiliary color component light is described. In response to the excitation light emitted from the excitation light source 20, auxiliary color component light is emitted from an illuminant layer of a reflection-type wheel 40. By superimposing this auxiliary color component light on an optical path of reference color component light emitted from the LEDs of RGB colors, it is intended to improve the color reproduction range (e.g., paragraphs 0016 to 0019 of the specification).

Patent Document 1: Japanese Patent Application Laid-open No. 2011-248272

SUMMARY

Problem to be Solved

As described above, in the image display apparatus such as a projector, a technology by which a color image with high quality can be displayed is desired.

In view of the circumstances as described above, it is an object of the present technology to provide an image display apparatus and an image generation method that are capable of displaying a color image with high quality.

Means for Solving the Problem

In order to achieve the above-mentioned object, an image display apparatus according to an embodiment of the present technology includes a solid-state light source, an emission unit, and a selection unit.

The solid-state light source is capable of emitting first visible light having a predetermined wavelength range.

The emission unit includes an illuminant that emits second visible light, the illuminant being excited by the first visible light emitted from the solid-state light source, the second visible light having a wavelength range different from that of the first visible light, the emission unit being capable of emitting combined light including the first and second visible light.

The selection unit selects third visible light from the combined light, the third visible light including the first visible light and light in a predetermined part of wavelength range of the second visible light.

In this image display apparatus, the third visible light including the first visible light that excites the illuminant and the light in the predetermined part of wavelength range of the second visible light emitted from the illuminant is generated. For example, by adjusting a predetermined part of wavelength range of the second visible light, it is possible to adjust the wavelength range of the third visible light. As a result, it is possible to display a color image with high quality by using the third visible light.

The selection unit may select the third visible light with a predetermined target chromaticity as a reference.

In this image display apparatus, the third visible light is selected so that the chromaticity is a predetermined target chromaticity or approaches the target chromaticity. Accordingly, it is possible to generate a color image with high quality.

The image display apparatus may include an image generation unit including three image generation elements that generate images of RGB colors and a combining unit that combines the images of RGB colors with each other. In this case, the selection unit selects the third visible light as blue light for generating a blue image out of the images of RGB colors.

Accordingly, because the wavelength range or chromaticity of the blue light can be adjusted, it is possible to generate a color image with high quality.

The solid-state light source may be a blue laser light source that emits laser light in a blue wavelength range. In this case, the light in the predetermined part of wavelength range of the second visible light may be light in a cyan wavelength range.

By including the light in the cyan wavelength range, it is possible to adjust the chromaticity of the laser light emitted from the blue laser light source to obtain a predetermined target chromaticity.

The blue laser light source may emit the blue laser light having a center wavelength of approximately 445 nm. In this case, the selection unit may select the third visible light from the combined light with light in a wavelength of approximately 520 nm as a reference.

As described above, even in the case where the blue laser light source having a short center wavelength is used, it is possible to select, as the third visible light, light having a predetermined target chromaticity or light having a substantially target chromaticity.

The selection unit may select the third visible light with a predetermined target chromaticity as a reference. In this case, the target chromaticity may be a chromaticity for blue color in an sRGB color gamut.

In this image display apparatus, it is possible to select, as the third visible light, light having a chromaticity for blue color in the sRGB color gamut or light similar thereto.

The illuminant may include any one of a YAG-based phosphor, a LAG-based phosphor, and a CaSN-based phosphor.

Even in the case where such a phosphor is used, it is possible to generate a color image with high quality by the present technology.

An image generation method according to an embodiment of the present technology includes by emitting first visible light having a predetermined wavelength range to an illuminant, causing the illuminant to emit second visible light having a wavelength range different from that of the first visible light, and emitting combined light including the first and second visible light; and generating an image by selecting third visible light from the emitted combined light and modulating the selected third visible light, the third visible light including the first visible light and light in a predetermined part of wavelength range of the second visible light.

Effects

As described above, according to the present technology, it is possible to display a color image with high quality. Note that the effect described here is not necessarily limitative and may be any effect described in the present disclosure.

DESCRIPTION OF PREFERRED EMBODIMENTS

Hereinafter, embodiments of the present technology will be described with reference to the drawings.

[Image Display Apparatus]

Figure 1:
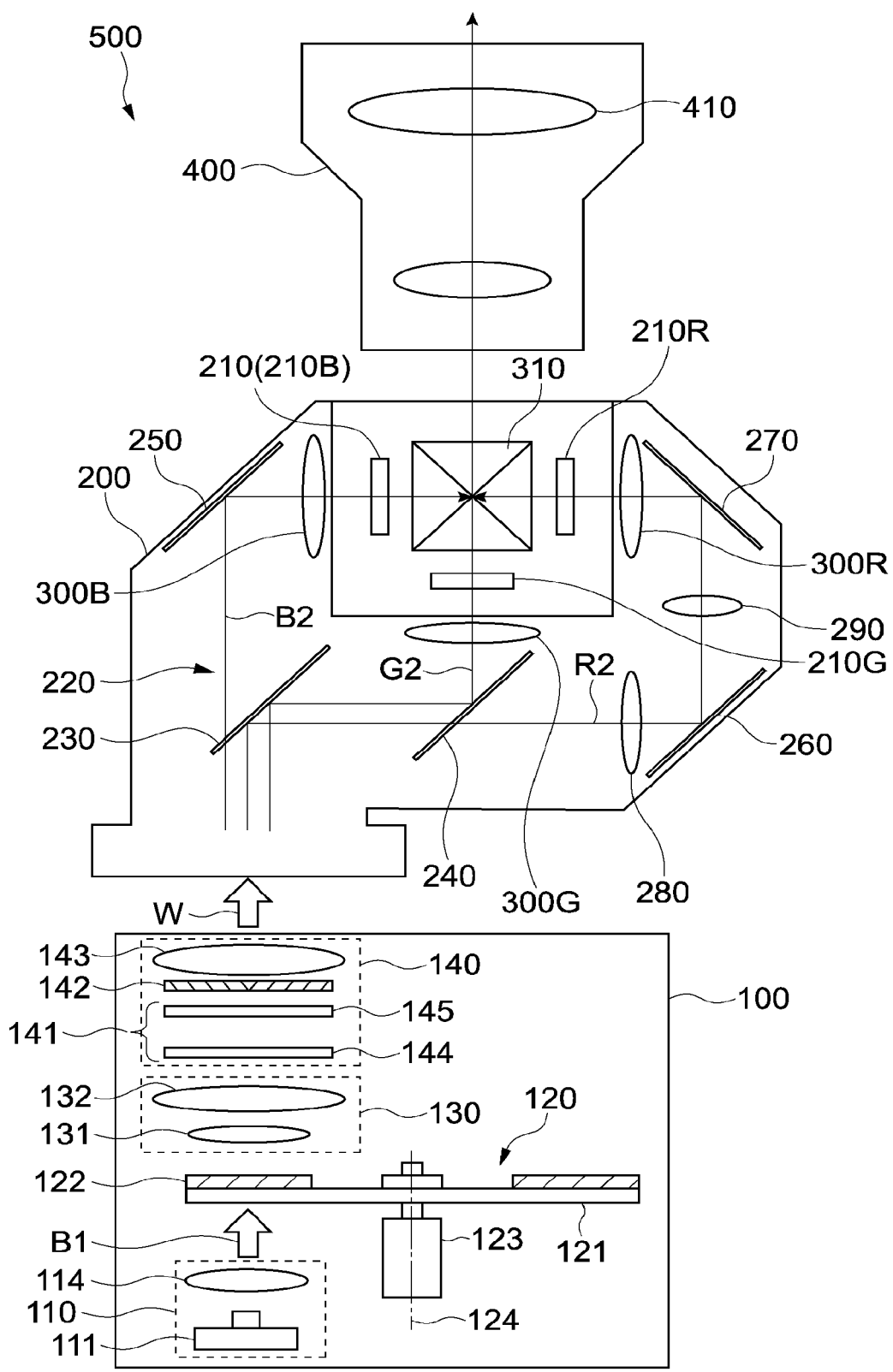
[FIG. 1] A schematic diagram showing a configuration example of an image display apparatus according to an embodiment.

FIG. 1 is a schematic diagram showing a configuration example of an image display apparatus according to an embodiment of the present technology. An image display apparatus 500 is used as, for example, a projector for presentation or digital cinema. The present technology described below can be applied also to an image display apparatus used for other usage.

The image display apparatus 500 includes a light source apparatus 100 capable of emitting white light, an image generation system (image generation unit) 200 that generates an image on the basis of the light from the light source apparatus 100, and a projection system 400 that projects the generated image on a screen or the like (not shown).

The light source apparatus 100 includes a light source unit 110, a phosphor wheel 120, a lens unit 130, and an integrator optical system 140. The light source unit 110 includes a blue laser light source (solid-state light source) 111 capable of emitting a blue laser light B1 in a blue wavelength range, a collective lens 114 that collects the blue laser light B1 in a predetermined point of the phosphor wheel 120, and the like.

In this embodiment, the blue laser light source 111 that emits the blue laser light B1 having a center wavelength of approximately 445 nm is used. The blue laser light source 111 may be used alone or a plurality of blue laser light sources 111 may be arranged in a two-dimensional pattern and used. By using the plurality of blue laser light sources 111 as a laser array light source (surface light source), it is possible to display an image with high brightness.

The phosphor wheel 120 includes a disc-shaped substrate 121 through which the blue laser light B1 is transmitted and a phosphor layer (illuminant) 122 provided on the substrate 121. To the center of the substrate 121, a motor 123 that drives the phosphor wheel 120 is connected. The phosphor wheel 120 is provided to be capable of rotating about the rotational axis 124.

The phosphor layer 122 includes a fluorescent material that emits fluorescence by being excited by the blue laser light B1. The phosphor layer 122 converts a part of the blue laser light B1 emitted from the blue laser light source ill into light in a yellow wavelength range, and emits it. As the fluorescent material included in the phosphor layer 122, for example, a YAG (yttrium aluminum garnet)-based phosphor is used. Further, the phosphor layer 122 is capable of emitting also the blue laser light B1 emitted from the blue laser light source 111 by transmitting a part of the excitation light therethrough.

In the state where the substrate 121 is rotated by the motor 123, the blue laser light B1 is emitted from the laser light source 111. The blue laser light B1 is applied to the phosphor layer 122 in a relatively circular motion in time with the rotation of the substrate 121. Accordingly, from the phosphor layer 122, white light (combined light) W including the blue laser light B1 transmitted through the phosphor 121 and light in the yellow wavelength range emitted from the phosphor layer 122 is emitted.

The lens unit 130 includes a first lens 131 that suppresses the spread of the white light W emitted from the phosphor wheel 120 and a second lens 132 that substantially collimates the white light W that is incident from the first lens 131.

The integrator optical system 140 includes an integrator element 141, a polarization conversion element 142, and a collective lens 143. The integrator element 141 includes first and second fly-eye lenses 144 and 145. By the integrator element 141, the brightness distribution of the white light W that is applied to the polarization conversion element 142 is made uniform.

The polarization conversion element 142 has a function of making the polarization state of the white light W that is incident via the integrator element 141 uniform. The white light W whose polarization state is made uniform is emitted to the image generation system 200 via the collective lens 143. In this embodiment, an emission unit is realized by the phosphor wheel 120, the lens unit 130, and the integrator optical system 140.

The image generation system 200 includes three liquid crystal light valves (image generation elements) 210 that generate images of RGB colors (a red image, a green image, and a blue image), and an illumination optical system 220 that applies light to each liquid crystal light valve 210. Further, the image generation system 200 includes a dichroic prism (combining unit) 310 that combines the images of RGB colors with each other.

The liquid crystal light valves 210 each modulate incident light for each pixel on the basis of a supplied image signal, and generate a red image, a green image, and a blue image. The modulated lights of the colors (formed images of the colors) enter the dichroic prism 310 and are combined with each other. The dichroic prism 310 superimposes the lights (images) of the colors entered from three directions on one another, combines them with each other, and emits the combined light to the projection system 400.

The illumination optical system 200 selects, from the white light W emitted from the light source apparatus 100, a red light R2 for generating a red image, a green light G2 for generating a green image, and a blue light B2 for generating a blue image. The selected lights R2, G2, and B2 of RGB colors are respectively emitted to liquid crystal light valves 210R, 210G, and 210B that modulate the lights of the colors. Accordingly, the images of RGB colors are generated.

As shown in FIG. 1, the illumination optical system 220 includes dichroic mirrors 230 and 240, mirrors 250, 260, and 270, relay lenses 280 and 290, and field lenses 300R, 300G, and 300B.

The dichroic mirrors 230 and 240 each have properties that cause color light having a predetermined wavelength range to be selectively transmitted therethrough, and reflect light in other wavelength ranges. In this embodiment, the dichroic mirror 230 causes the blue light B2 to be selectively transmitted therethrough, and reflects the other lights. The dichroic mirror 240 causes the red light R2 out of the lights reflected by the dichroic mirror 230 to be selectively transmitted therethrough. The remaining green light G2 is reflected by the dichroic mirror 240. Accordingly, the white light W emitted from the light source apparatus 100 is divided into lights of RGB colors.

The separated blue light R2 is reflected by the mirror 250, and collimated by passing through the field lens 300B before entering the liquid crystal light valve 210B. The red light R2 passes through the relay lens 280, is reflected by the mirror 260, passes through the relay lens 290, and is reflected by the mirror 270. The red light R2 reflected by the mirror 270 is collimated by passing through the field lens 300R before entering the liquid crystal light valve 210R. The green light G3 is collimated by passing through the field lens 300G before entering the liquid crystal light valve 210G.

The projection system 400 includes a plurality of lenses 410 and the like, and projects the image combined by the dichroic prism 310 on a screen or the like (not shown). Accordingly, a full-color image is displayed.

In this embodiment, the blue laser light B1 corresponds to a first visible light having a predetermined wavelength range. Further, the light in the yellow wavelength range emitted from the phosphor layer 122 corresponds to a second visible light having a wavelength range different from that of the first visible light. Therefore, the white light W is combined light including the first and second visible lights.

Further, in this embodiment, the dichroic mirror 230 shown in FIG. 1 functions also as a selection unit that selects, from the combined light, a third visible light including the first visible light and the light in the predetermined part of wavelength range of the second visible light.

Therefore, by the dichroic mirror 230, the third visible light including the blue laser light B1 and light in the predetermined part of wavelength range of the light in the yellow wavelength range is divided from the white light W. The divided third visible light is emitted to the liquid crystal light valve 210B as the blue light B2 for generating a blue image.

Figure 2:
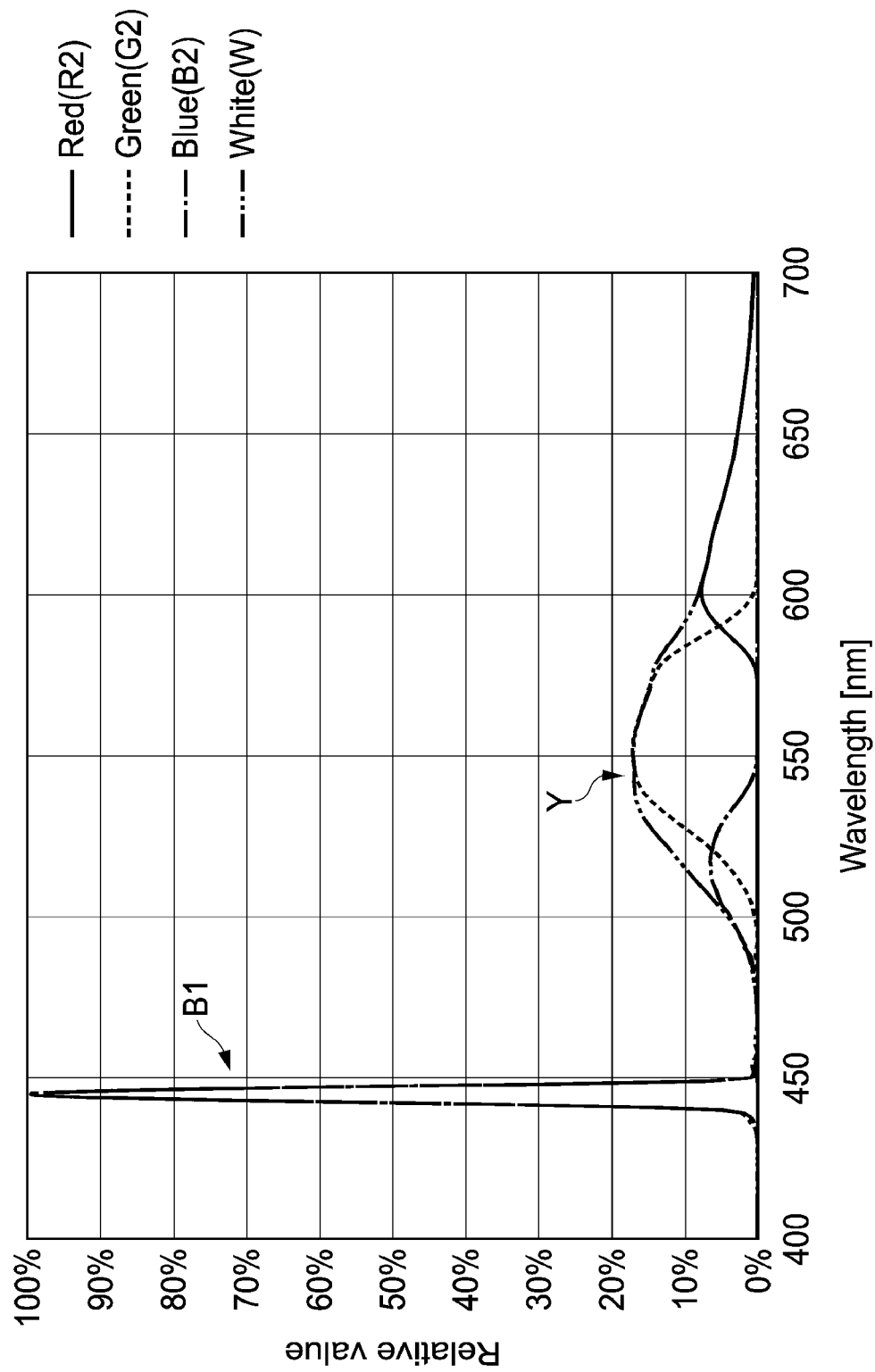
[FIG. 2] A diagram showing the light emission spectra of lights emitted from a projection system when images of RGB colors and a white image are displayed by respective single colors.

FIG. 2 is a diagram showing the light emission spectra of lights emitted from the projection system 400 when images of RGB colors and a white image obtained by combining them are displayed by respective single colors. The light emission spectra of the images of the colors can be regarded as the light emission spectra of the white light W emitted to the image generation system 200 and the red light R2, the green light G2, and the blue light B2 divided by the illumination optical system 220.

As shown in FIG. 2, the laser light B1 having a relatively narrow wavelength range and a center wavelength of approximately 445 nm and a light Y in the yellow wavelength range having a relatively wide wavelength range from approximately 460 nm to approximately 700 nm and the peak wavelength of the emission intensity of approximately 550 nm are combined with each other to generate the white light W.

Figure 3:
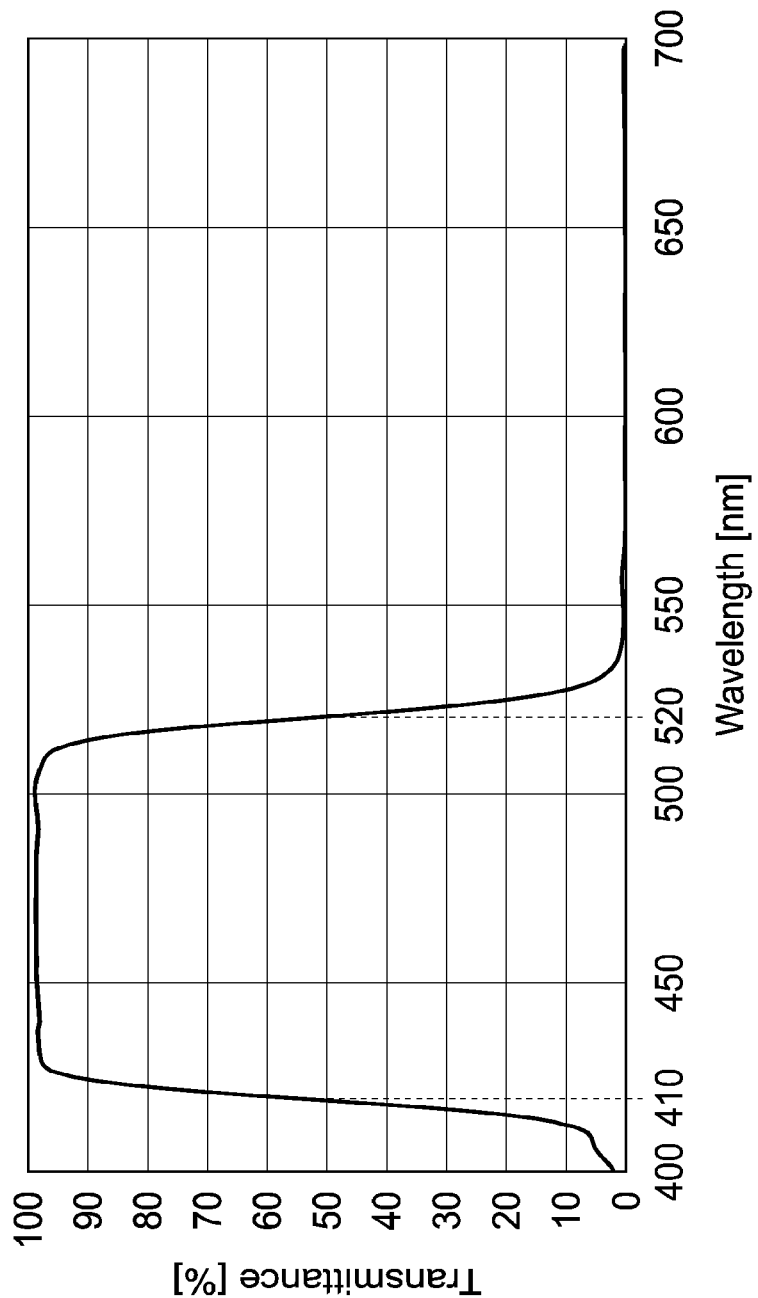
[FIG. 3] A diagram showing the spectral characteristics of a dichroic mirror that functions as a selection unit.
Figure 4:
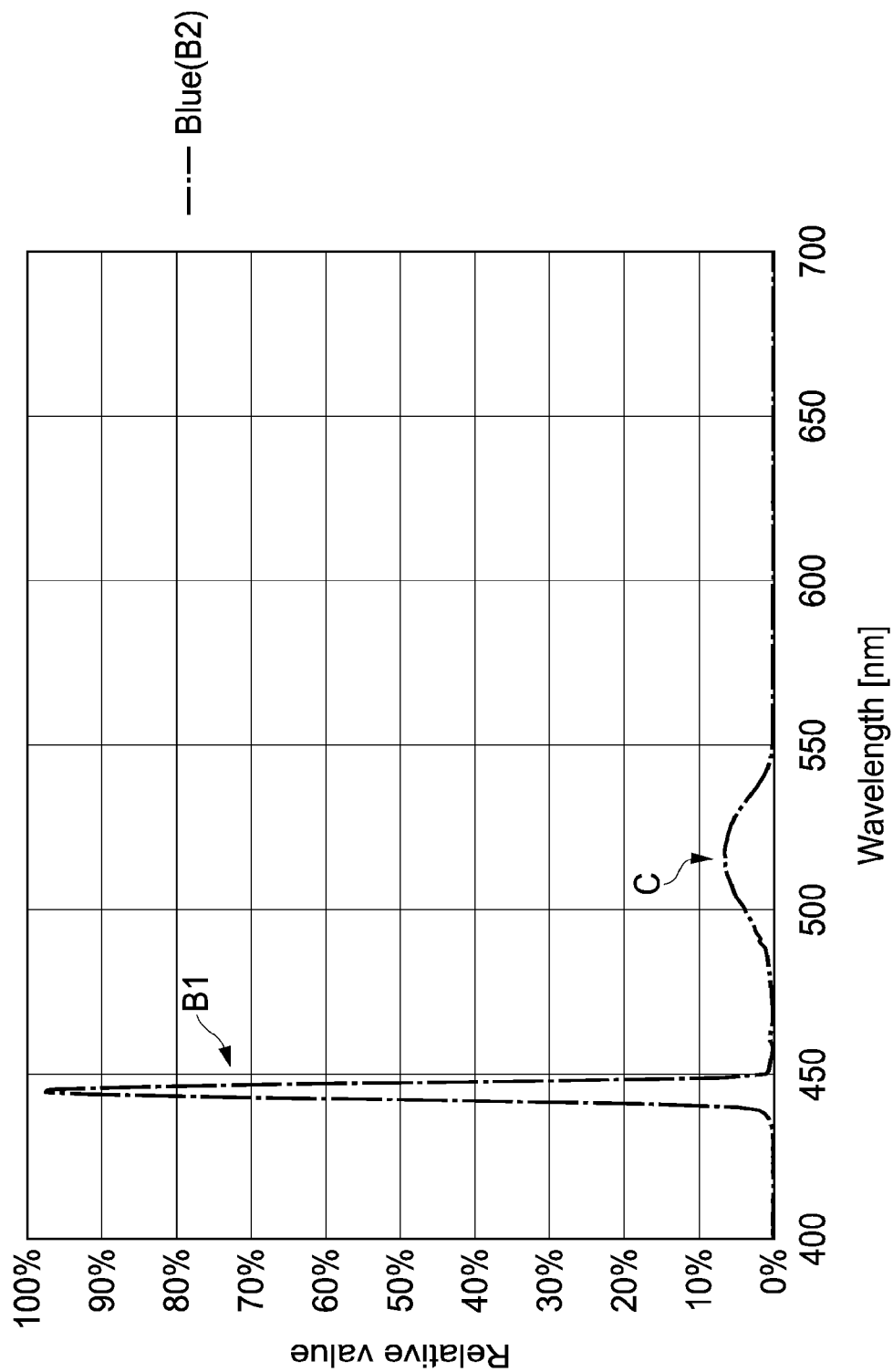
[FIG. 4] A diagram showing the light emission spectrum of blue light.

FIG. 3 is a diagram showing the spectral characteristics of the dichroic mirror 230. FIG. 4 is a diagram showing the light emission spectrum of the blue light B2 out of the light emission spectra of the colors shown in FIG. 2. As shown in FIG. 3, in this embodiment, light in the wavelength from approximately 410 nm to approximately 520 nm is transmitted through the dichroic mirror 230, and light in other wavelengths is reflected by the dichroic mirror 230. The wavelength shown here is a half-width wavelength having a transmittance of 50%.

Therefore, as shown in FIG. 4, the laser light B1 having a center wavelength of approximately 445 nm and a light C (cyan component light) in the cyan wavelength range having a wavelength range from approximately 460 nm to approximately 545 nm and the peak wavelength of approximately 515 nm are transmitted through the dichroic mirror 230. The third visible light including the blue laser light B1 and the light C in the cyan wavelength range is emitted to the liquid crystal panel 210B as the blue light B2.

Note that wavelength ranges of colors of RGB, yellow, cyan, and the like, are not limited to those specified by particular values and may be appropriately set. The general values considered as the wavelength ranges of the colors may be appropriately used.

Figure 5:
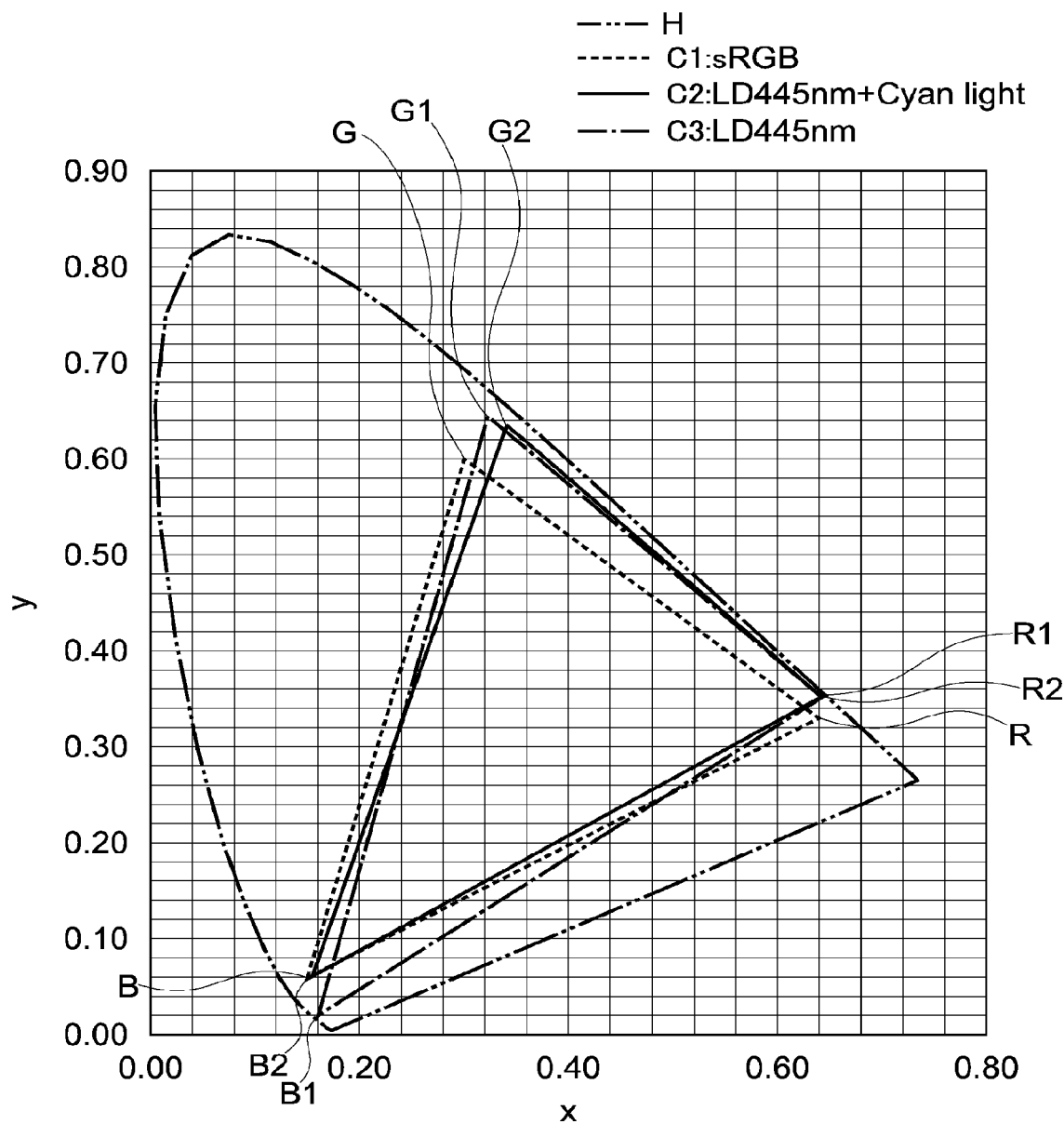
[FIG. 5] A diagram showing an xy chromaticity diagram on the basis of the XYZ color space defined by CIE.
Figure 6:
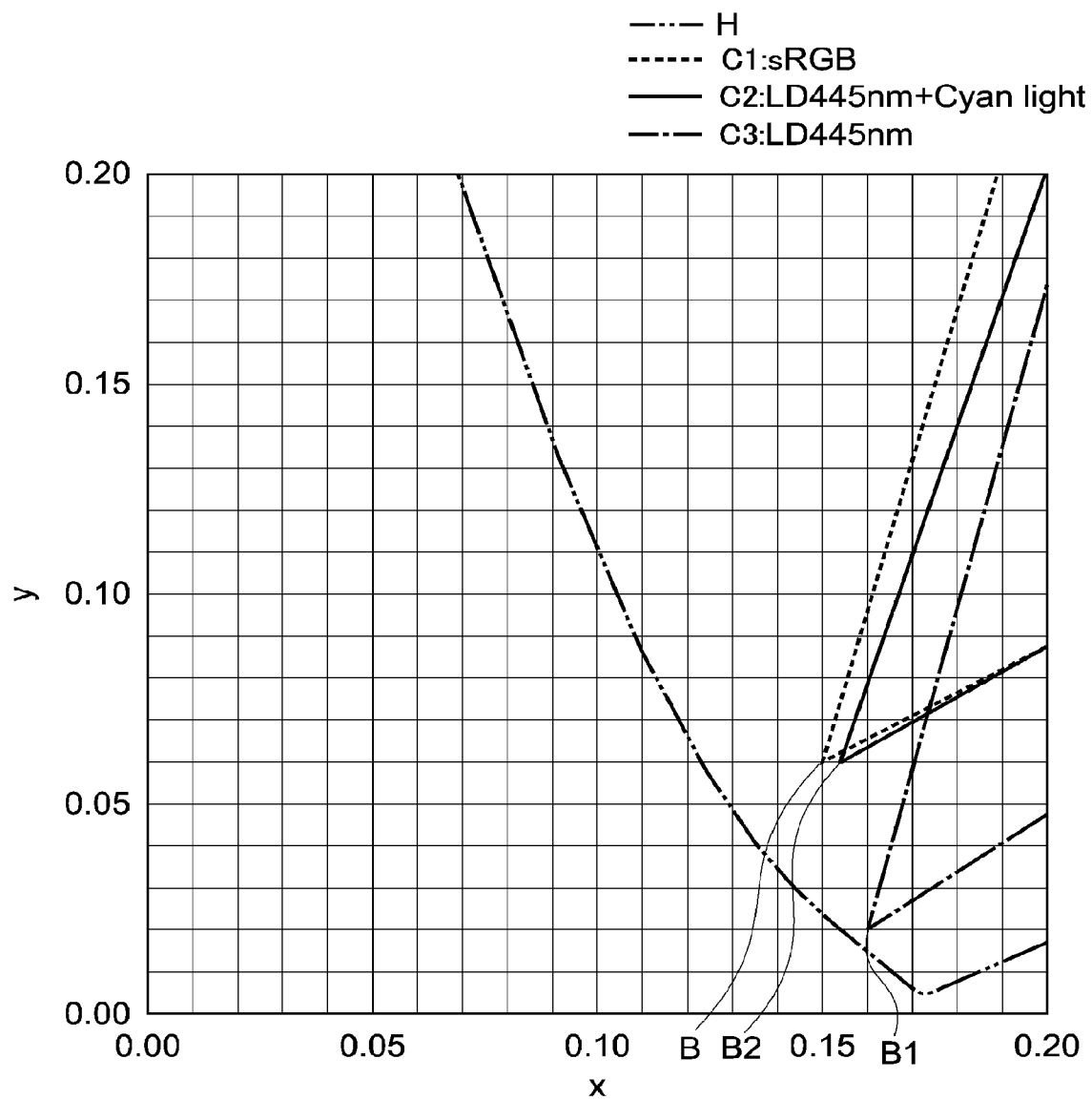
[FIG. 6] A diagram obtained by mainly enlarging a blue area in the xy chromaticity diagram shown in FIG. 5.

FIG. 5 is a diagram showing an xy chromaticity diagram on the basis of the XYZ color space defined by CIE (International Commission on Illumination). FIG. 6 is a diagram obtained by mainly enlarging a blue area in the xy chromaticity diagram. A horseshoe-shaped range H in FIG. 5 represents a range of colors that can be recognized by eyes of humans. The substantially central portion of the range H corresponds to a white color (achromatic color), and the saturation increases as it approaches the peripheral portion. The peripheral portion of the range from the lower left chromaticity point to the right chromaticity point through a curve in the range H represents chromaticity points of single colors (pure colors) from purple to red colors.

In the range H, three types of color gamuts C1, C2, and C3 represented by triangles are shown. In each color gamut, the vertices of the triangle correspond to chromaticity points of RGB as three primary colors of the color gamut. The lower left vertex of the triangle is the chromaticity point of a blue color, and the upper vertex is the chromaticity point of a green color. On the other hand, the right vertex is the chromaticity point of a red color. The internal colors of the triangle are expressed by the RGB. Therefore, the color gamut represents the range of colors that can be reproduced (expressed).

The color gamut C1 shown in FIG. 5 is a color gamut of sRGB defined by IEC (hereinafter, referred to as the sRGB color gamut C1). The chromaticity coordinates of the RGB as three primary colors of the sRGB color gamut C1 are as follows.

$R: (x=0.640, y=0.330)$ $G: (x=0.300, y=0.600)$ $B: (x=0.150, y=0.060)$

The color gamut C2 is a color gamut with the red light R2, the green light G2, and the blue light B2 dispersed by the illumination optical system 220 including the dichroic mirror 230 according to this embodiment as three primary colors.

The color gamut C3 is a color gamut shown as a comparative example, and a color gamut in the case where the blue laser light B1 emitted from the blue laser light source 111 shown in FIG. 1 is used as it is as the blue light. For example, assumption is made that instead of the dichroic mirror 230 shown in FIG. 1, a dichroic mirror that causes light in a wavelength of less than approximately 500 nm to be transmitted therethrough and reflects light in a wavelength of not less than that is used (wavelength is a half-width wavelength). In this case, the laser light B1 having a center wavelength of approximately 445 nm is emitted to the liquid crystal panel 210B as it is as the blue light.

The light Y in the yellow wavelength range emitted from the phosphor layer 122 is reflected, and divided into red light and green light (referred to as red light R1 and green light G1, respectively). The color gamut C3 is a color gamut with the blue laser light B1, the red light R1, and the green light G1 as three primary colors.

As shown in FIG. 6, the coordinate pair of the chromaticity point of the blue laser light B1 is in the vicinity of (x=0.160, y=0.020), and is largely displaced from the chromaticity point of the blue color B in sRGB. Because x and y coordinates decrease, it looks deep blue (indigo blue). Further, because the chromaticity point B of the blue color in sRGB is not included in the color gamut C3, it is difficult to display the blue color in sRGB. As a result, the color reproducibility of a displayed image is reduced.

The blue light B2 selected by the dichroic mirror 230 includes the blue laser light B1 and the light C in the cyan wavelength range. Therefore, as shown in FIG. 6, the position of the chromaticity point of the blue light B2 is sufficiently close to the chromaticity point of the blue color B in sRGB. It goes without saying that it is possible to use the present technology to cause the chromaticity point of the blue light B2 to match with the chromaticity point of the blue color B in sRGB.

As described above, in the image display apparatus 500 according to this embodiment, the blue light B2 including the blue laser light B1 that excites the phosphor layer 122 and the light C in the cyan wavelength range as light in the predetermined part of wavelength range of the light Y in the yellow wavelength range emitted from the phosphor layer 122 is generated. For example, by adjusting the wavelength range of light added to the blue laser light B1, it is possible to adjust the wavelength range of the blue light B2. As a result, it is possible to generate a color image with high quality by using the blue light B2. Further, because there is no need of a new light source for generating the auxiliary color component light described in Patent Document 1, it is very advantageous for miniaturization of an apparatus or simplification.

Typically, as described above, the blue light B2 is selected from the white light W so that the chromaticity of the blue light B2 is a target chromaticity or approaches the target chromaticity with a predetermined target chromaticity as a reference. For example, on the basis of the light emission spectra shown in FIG. 1 or FIG. 3, it is possible to calculate the chromaticity of the light. Therefore, it only has to appropriately adjust the wavelength range of the light added to the blue laser light B2 so that the light emission spectrum of the blue light B2 corresponds to a desired chromaticity.

For example, by using dichroic mirrors having different spectral characteristics, it is possible to adjust the chromaticity of the blue light B2. By adjusting the transmissive wavelength range, cyan component light added to the blue laser light B2 can be adjusted, and thus, it is possible to adjust the chromaticity of the blue light B2. Note that the selection unit that selects the blue light B2 from the white light W is not limited to the dichroic mirror, and may be another optical member such as a dichroic prism.

In the case of the dichroic mirror having the existing spectral characteristics corresponding to a mercury lamp or the like, cyan component light is cut in most cases in order to obtain proper blue light. This is because a blue color is made shallow when cyan component light is transmitted on the optical path of the blue light.

When a solid-state light source such as a laser light source is used instead of a mercury lamp or the like, the color gamut is the color gamut C3 shown in FIG. 5 and FIG. 6 and the color reproducibility may be reduced if a dichroic mirror having the existing spectral characteristics is used. In view of this new problem, the present inventor has invented that cyan component light that is cut in related art is caused to be transmitted and added to blue laser light. Accordingly, even in the case where laser light having a narrow wavelength range is used, it is possible to improve the chromaticity thereof.

Note that it is conceivable that a laser light source that emits blue laser light having a center wavelength of a long wavelength is used to obtain proper blue light without adding cyan component light. However, when the wavelength of the emitted laser light is prolonged, the light emission efficiency of the laser light source is reduced and the light emission power is reduced. Therefore, in the case where such a laser light source is used, the brightness of a displayed image is reduced. In the present technology, because the chromaticity of blue light can be adjusted even in the case where a blue laser light source that emits blue laser light in a short wavelength and has high light emission power is used, it is possible to display an image with high quality.

Other Embodiments

The present technology is not limited to the above-mentioned embodiment, and can achieve other various embodiments.

The present technology can be applied without limiting the color, wavelength range, center wavelength, peak wavelength, and the like of the first visible light, the second visible light, the third visible light, and the light in the predetermined part of wavelength range of the second visible light. For example, light of an arbitrary color such as light in a red wavelength range, a green wavelength range, and a yellow wavelength range may be emitted as the first visible light. The phosphor layer that can be excited by the first visible light is appropriately arranged, and combined light including the first visible light and the second visible light is emitted. Because the wavelength range and chromaticity of the third visible light selected from the combined light can be appropriately adjusted, it is possible to generate a color image with high quality and display it.

Typically, in order to adjust the depth (density, saturation) of the color of light emitted as the first visible light, the present technology is effectively used. It goes without saying that it is not limited thereto.

As the fluorescent material included in the phosphor layer, in addition to the above-mentioned YAG-based phosphor, a LAG (lutetium aluminum garnet)-based phosphor that emits light in a yellow wavelength range, a CaSN-based (nitride-based) phosphor that emits light in a red wavelength range, or the like may be used. Alternatively, other phosphors may be used.

In the above, the blue light B2 is selected from the white light W by the dichroic mirror 230 as the first dichroic mirror. However, in the case where three or more lights including the third visible light are selected the combined light, the selection order of the third visible light is not limited. For example, in the above-mentioned embodiment, red light and light in a cyan wavelength range may be separated first, and then, green light and blue light as the third visible light may be divided from the light in the cyan wavelength range. In this case, it only has to appropriately set the spectral characteristics of the second dichroic mirror.

In the above, the dichroic mirror 230 having a half-width wavelength of approximately 520 nm has been used. This is an example of a selection method with light in a wavelength of approximately 520 nm as a selection reference. However, it is not limited thereto. For example, the selection method with light in a wavelength of approximately 520 nm as a selection reference includes a method in which the third visible light is selected by a dichroic mirror or the like through which light in the maximum wavelength of approximately 520 nm can be transmitted.

In the above, the third visible light has been selected with the chromaticity of the blue color in sRGB as the target chromaticity. However, the target chromaticity is not limited thereto. The chromaticity of another color in sRGB may be set as the target chromaticity. Alternatively, the chromaticity of each vertex of the color gamut or the like of Adobe (registered trademark) RGB standard, DCI (Digital Cinema Initiatives) standard, or NTSC (National Television System Committee) standard different from sRGB may be set as the target chromaticity. Further, a chromaticity having an arbitrary chromaticity coordinate pair may be set as the target chromaticity by the user or the like.

In the above, the red light, the green light, and the blue light have been generated for generating the images of RGB colors. However, it is not limited thereto. For example, lights of cyan, magenta, and yellow colors may be generated, and images of the three colors may be combined with each other, thereby generating a color image. Further, images of four or more colors may be combined with each other. The present technology can be applied also to these cases.

The present technology can be applied also to the case where an LED is used as the solid-state light source. Another solid-state light source may be used.

Note that the effects described in the present disclosure are merely examples and are not limited, and additional effects may be provided. The description of the plurality of effects does not represent that these effects are necessarily simultaneously exerted. It represents that at least any of the above-mentioned effects is acquired depending on the condition and the like. It goes without saying that also an effect that is not described in the present disclosure may be exerted.

At least two features of the features of the above-mentioned embodiments may be combined. Specifically, various features described in each embodiment may be arbitrarily combined without distinguishing the embodiments with each other.

It should be noted that the present technology may take the following configurations.

(1) An image display apparatus, including:
a solid-state light source capable of emitting first visible light having a predetermined wavelength range;
an emission unit including an illuminant that emits second visible light, the illuminant being excited by the first visible light emitted from the solid-state light source, the second visible light having a wavelength range different from that of the first visible light, the emission unit being capable of emitting combined light including the first and second visible light; and
a selection unit that selects third visible light from the combined light, the third visible light including the first visible light and light in a predetermined part of wavelength range of the second visible light.

(2) The image display apparatus according to (1) above, in which
the selection unit selects the third visible light with a predetermined target chromaticity as a reference.

(3) The image display apparatus according to (1) or (2), further including
an image generation unit including three image generation elements that generate images of RGB colors and a combining unit that combines the images of RGB colors with each other, wherein
the selection unit selects the third visible light as blue light for generating a blue image out of the images of RGB colors.

(4) The image display apparatus according to any one of (1) to (3), in which
the solid-state light source is a blue laser light source that emits laser light in a blue wavelength range, and
the light in the predetermined part of wavelength range of the second visible light is light in a cyan wavelength range.

(5) The image display apparatus according to (4), in which
the blue laser light source emits the blue laser light having a center wavelength of approximately 445 nm, and
the selection unit selects the third visible light from the combined light with light in a wavelength of approximately 520 nm as a reference.

(6) The image display apparatus according to any one of (1) to (5), in which
the selection unit selects the third visible light with a predetermined target chromaticity as a reference, and
the target chromaticity is a chromaticity for blue color in an sRGB color gamut.

(7) The image display apparatus according to any one of (1) to (6), in which
the illuminant includes any one of a YAG-based phosphor, a LAG-based phosphor, and a CaSN-based phosphor.

DESCRIPTION OF REFERENCE NUMERALS

B1 blue laser light
B2 blue light
C light in the cyan wavelength range
W white light
Y light in the yellow wavelength range
100 light source apparatus
111 blue laser light source
120 phosphor wheel
122 phosphor layer
130 lens unit
140 integrator optical system
200 image generation system
210 liquid crystal panel
230 dichroic mirror
310 dichroic prism
400 projection system
500 image display apparatus

The invention claimed is:
1. An image display apparatus, comprising:
a solid-state light source capable of emitting first visible light having a predetermined wavelength range;

an emitter including an illuminant that emits second visible light, the illuminant being excited by the first visible light emitted from the solid-state light source, the second visible light having a wavelength range different from that of the first visible light, the emitter being capable of emitting combined light including the first and second visible light; and a selector including a dichroic mirror that selects third visible light directly from the combined light by selectively transmitting the third visible light therethrough, the third visible light including the first visible light and light in a predetermined part of wavelength range of the second visible light, wherein the light in the predetermined part of wavelength range of the second visible light is light in a cyan wavelength range between 460 nm and 545 nm.

2. The image display apparatus according to claim 1, wherein
the selector selects the third visible light with a predetermined target chromaticity as a reference.

3. The image display apparatus according to claim 1, further comprising
an image generator including three image generation elements that generate images of RGB colors and a combiner that combines the images of RGB colors with each other, wherein
the selector selects the third visible light as blue light for generating a blue image out of the images of RGB colors.

4. The image display apparatus according to claim 1, wherein
the solid-state light source is a blue laser light source that emits laser light in a blue wavelength range.

5. The image display apparatus according to claim 4, wherein
the blue laser light source emits the blue laser light having a center wavelength of approximately 445 nm, and
the selector selects the third visible light from the combined light with light in a wavelength of approximately 520 nm as a reference.

6. The image display apparatus according to claim 1, wherein
the selector selects the third visible light with a predetermined target chromaticity as a reference, and
the target chromaticity is a chromaticity for blue color in an sRGB color gamut.

7. The image display apparatus according to claim 1, wherein
the illuminant includes any one of a YAG-based phosphor, a LAG-based phosphor, and a CaSN-based phosphor.

8. An image generation method, comprising:
emitting first visible light having a predetermined wavelength range to an illuminant to excite the illuminant, causing the illuminant to emit second visible light having a wavelength range different from that of the first visible light, and emitting combined light including the first and second visible light; and
generating an image by selecting third visible light from the emitted combined light via a dichroic mirror that selects the third visible light directly from the combined light by selectively transmitting the third visible light therethrough, and modulating the selected third visible light, the third visible light including the first visible light and light in a predetermined part of wavelength range of the second visible light, wherein the light in the predetermined part of wavelength range of the second visible light is light in a cyan wavelength range between 460 nm and 545 nm.

* * * * *